United States Patent [19]
Perez de la Garza

[11] Patent Number: 5,227,144
[45] Date of Patent: Jul. 13, 1993

[54] PROCESS FOR AIR DECONTAMINATION

[76] Inventor: Antonio Perez de la Garza, Tula No. 3, Col., Condesa, Mexico, 06140 D.F.

[21] Appl. No.: 867,132

[22] Filed: Apr. 10, 1992

[30] Foreign Application Priority Data

May 27, 1991 [MX] Mexico .................................. 25938

[51] Int. Cl.$^5$ ............................................ B01D 53/00
[52] U.S. Cl. ..................................... 423/210; 423/219; 423/220; 423/235; 423/242.1; 423/246
[58] Field of Search ............... 423/210, 219, 599, 225, 423/235, 242.1, 243.07, 243.08, 244.06, 246, 247, 220

[56] References Cited

U.S. PATENT DOCUMENTS

| | | | |
|---|---|---|---|
| 3,383,164 | 5/1968 | Harkness | 423/246 |
| 3,998,714 | 12/1976 | Armstrong | 210/62 |
| 4,369,167 | 1/1983 | Weir, Jr. | 423/210 |
| 4,839,147 | 6/1989 | Lindbauer et al. | 423/235 |
| 5,096,680 | 3/1992 | Lindbauer et al. | 423/239 |
| 5,120,515 | 1/1992 | Audeh et al. | 423/210 |

FOREIGN PATENT DOCUMENTS 5085580  4/1973  Japan .................................. 423/235

*Primary Examiner*—Gary P. Straub
*Assistant Examiner*—Timothy C. Vanoy
*Attorney, Agent, or Firm*—Baker & Daniels

[57] ABSTRACT

Process for air decontamination consists of circulating air in a soaking chamber through several air-permeable barriers which are continuously bathed in solutions containing various chemical reagents which remove toxic, solid and gaseous pollutants from the air. The first of these barriers contains water to eliminate all solid particles suspended in the gas flow, either animal, vegetal or mineral in origin, and to also start eliminating carbon monoxide; the second barrier contains a hydroxide of some alkali metal for the complete elimination of nitrogen dioxide, hydrogen sulfide and prussic acid, as well as part of the ozone; the third barrier contains sulfuric acid and eliminates carbon monoxide; the fourth barrier contains a hydroxide of some alkali earth metal, eliminating carbon dioxide; the fifth barrier contains sodium nitrite and eliminates ozone; the sixth barrier contains potassium permanganate eliminating sulfur dioxide; and the seventh barrier contains a diluted solution of sodium hypochlorite to eliminate all vestiges of any of the reagents.

1 Claim, 1 Drawing Sheet

PROCESS FOR AIR DECONTAMINATION

BACKGROUND OF THE INVENTION

The present invention is based on the principle that matter is neither created nor destroyed. It only transforms itself. This invention changes the toxic gases contained in air, such as nitrogen dioxide, carbon monoxide, carbon dioxide, ozone, sulfur dioxide, hydrogen sulfide, prussic acid and other compounds to other substances which cease to be gases, to be converted to solids dissolved in the proper solutions for each case. Also, in its starting step, it eliminates all microsolids suspended in the gas flow, capturing them in an aqueous solution from which they can later be removed as "silt", for further use as fertilizers or in other ways, according to the final chemical analysis.

The purpose of the invention is to chemically process the environmental air, or the gas flow issuing out of industrial plant stacks, exhausts of vehicles and so on, by fighting the pollution produced, not by preventing it but by eliminating toxic gases, many times colorless, and in some other instances odorless and tasteless, which at particular levels can be lethal for all living things, either animals or plants, in the air, on land and in the sea.

At present there are "air cleaners" which serve to eliminate airborne solid particles by electrostatically charging them, and also some gases by "ionizing" them; but as soon as the ionization is stopped, said ions tend to reconstitute their old compounds and others, perhaps even more toxic than the first substances. In addition, the "air cleaners" can also be used in closed spaces to perform their ionizing action.

There are also evaporative humidifiers which transfer water to the air, thus cooling it.

SUMMARY OF THE INVENTION

The present invention, the process for decontaminating the air, differs from prior procedures in that it systematically and in an ordered way eliminates airborne solids, nitrogen dioxide, hydrogen sulfide, prussic acid, carbon monoxide, carbon dioxide, ozone and sulfonated derivatives, such as sulfur dioxide. There is a phase change from a gas to microsolids, in such a way that these are captured in proper solutions and fed to the soaking chamber for tan purpose.

BRIEF DESCRIPTION OF THE DRAWINGS

The drawing illustrates a flow-chart of the process of the present invention.

DETAILED DESCRIPTION OF THE PREFERRED EMBODIMENT

Figure 1:
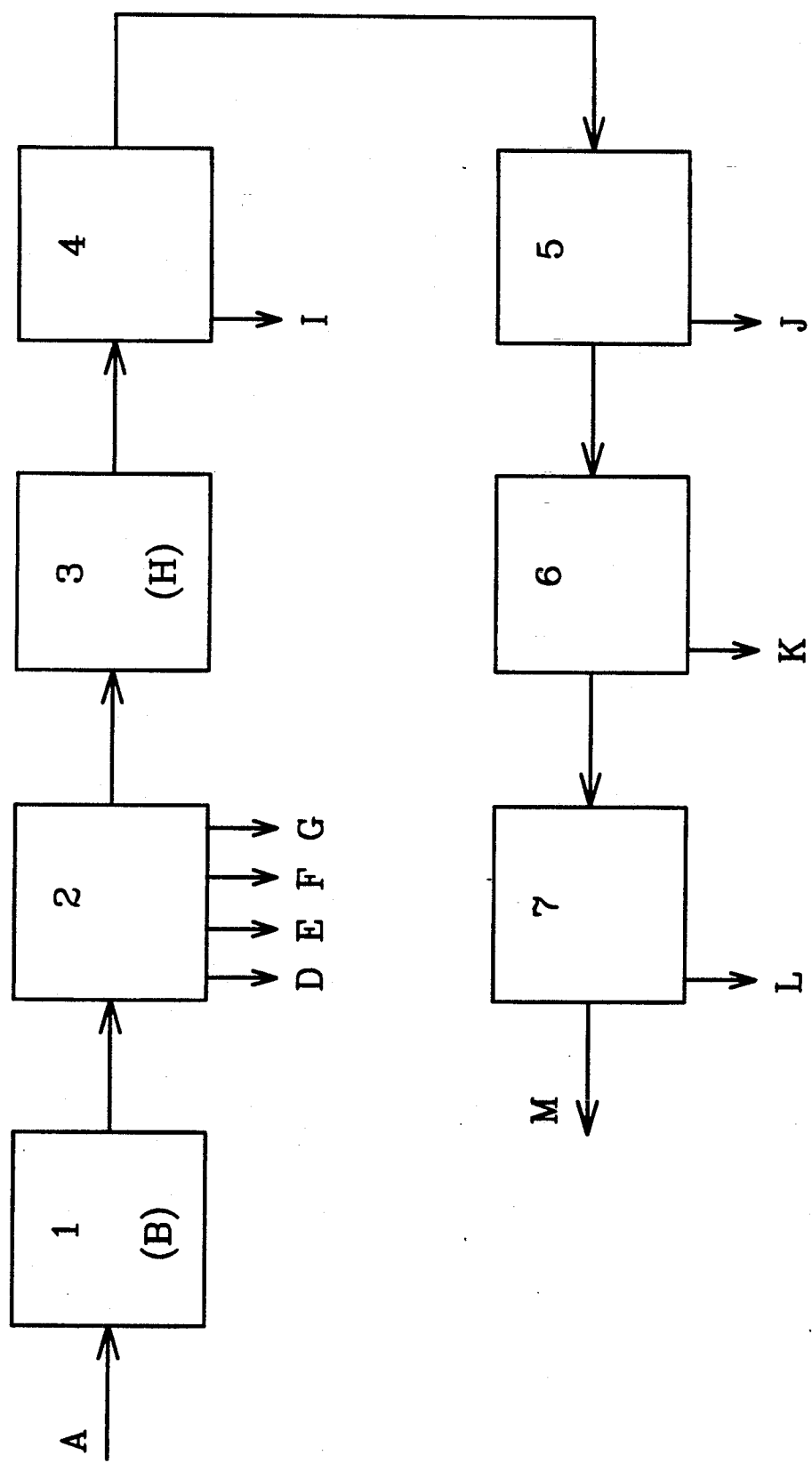

Referring now to the drawing:
A.- Indicates the flow of polluted air.
B.- Oxidizing of some CO to $CO_2$ (Carbon monoxide to carbon dioxide).
C.- Elimination of suspended solids.
D.- Elimination of $NO_2$ (nitrogen dioxide)
E.- Elimination of $H_2S$ (hydrogen sulfide)
-F.- Elimination of HCN (prussic acid)
G.- Elimination of some $O_3$ (ozone)
H.- Oxidizing of all CO to $CO_2$ (carbon monoxide to carbon dioxide)
I.- Elimination of $CO_2$ (carbon dioxide)
J.- Elimination of all $O_3$ (ozone)
K.- Elimination of $SO_2$ (sulfur dioxide)
L.- Elimination of $H_2SO_4$ (sulfurio acid)
M.- Flow of decontaminated air.

The various steps of the process are referenced by numbers, as follows:
1.- Humidification step
2.- Alkali hydroxide step
3.- Oxidizing acid step
4.- Alkali-earth hydroxide step
5.- Step of alkali anion, or alkali nitrite
6.- Alkali permanganate step
7.- Alkali hypochlorite step The reactions occurring in the various steps, or barriers, are indicated below:

At barrier number 1, water is fed to the soaking chamber where there is a flow of air with a high percentage of nitrogen and oxygen; but which could also contain small but unacceptable amounts of gas and suspended solid pollutants:

$$N_2 + H_2O \rightarrow$$

There is no reaction at the operating conditions.

$$O_2 + H_2O \rightarrow$$

Nitrogen and oxygen do not react with water, and only a dissolution of these elements in water can be considered.

$$SO_2 + H_2O \rightarrow H_2SO_3$$

$$2H_2SO_3 + O_2 \rightarrow 2H_2SO_4$$

Sulfur dioxide reacts with water, forming microdrops of sulfurous acid, which can later react with the oxygen present to form sulfuric acid. This is what is known as acid rain. In this case, a change in phase took place, from gas to liquid, but the initial sulfurated pollutant was converted to something more harmful: sulfurous acid at first, susceptible to become sulfuric acid at the microparticle level, able to enter the human respiratory system causing irritation and alterations. Up to this point, it can be assumed that this pollutant has not been eliminated.

$$2NO_2 + H_2O \rightarrow HNO_2 + HNO_3$$

$$4NO_2 + H_2O \rightarrow 2HNO_3 + N_2O_3$$

$$4NO_2 + O_2 + 2H_2O \rightarrow 4HNO_3$$

Nitrogen dioxide reacts with water in several ways depending on the amount of the compound present and on the presence or absense of oxygen at the time of the reaction; but in the product formed there is always nitric acid, and in some cases also nitrous acid, and in some other instances nitrogen trioxide. This is to say that here there is also acid rain, and the nitrogen pollutant was also converted to something much more harmful, changing its phase from gas to liquid microparticles, and it is safe to consider that up to this point the nitrogen pollutant has not been eliminated.

$$O_3 + H_2O \rightarrow \text{No reaction in these conditions}$$

Ozone, at the operating conditions of the atmospheric processor, does not react with water; thus, this pollutant does not change phases and is still present in the gas flow, for later elimination.

$$H_2S + H_2O \rightarrow \text{There is no reaction}$$

Hydrogen sulfide did not react with water under the operating conditions in this step of the atmospheric processor.

$$HCN + H_2O \rightarrow \text{No reaction}$$

Prussic acid does not react with water, and this pollutant will be eliminated in the following step.

$$CO + H_2O \rightarrow \text{No reaction}$$

Water does not affect carbon monoxide in the least; but in this step sulfuric acid was formed and sulfuric acid can oxidize carbon monoxide.

$$CO + H_2SO_4 \rightarrow CO_2 + SO_2 + H_2O$$

Carbon monoxide is oxidized to form carbon dioxide in the presence of sulfuric acid, freeing sulfur dioxide and water. Thus if carbon monoxide (a gas) comes into sulfuric acid (a microliquid), the products of the reaction would be: carbon dioxide (gas), sulfur dioxide (gas) and water (microdrop).

It can be said that, in this step of the atmospheric processor, carbon monoxide starts being eliminated; but more carbon dioxide is produced and, in general, no gas pollutant has been eliminated.

$$CO_2 + H_2O \rightarrow H_2CO_3$$

$$H_2CO_3 \rightarrow CO_2 + H_2O$$

Carbon dioxide reacts with water, forming carbonic acid; but this is a very unstable type of acid and is immediately broken down, forming again carbon dioxide and water. Thus carbon dioxide is not really affected in this step of the process.

Solid particles suspended in air are eliminated by being captured in the aqueous medium "bathing" the first air-permeable barrier through which the air passes.

Phase Number 2

It is designed to transform the gaseous nitrogen dioxide to nitrite and nitrate of some alkali metal. With this purpose in mind, the air-permeable barrier is bathed in this case, for instance, in an aqueous solution of sodium hydroxide, producing a change of phase in the nitrogen pollutant from gas to a microsolid, which will be dissolved in the bath solution.

In the previous phase there were formed, from nitrogen dioxide: nitric acid, nitrous acid, and nitrogen trioxide.

$$HNO_3 + NaOH \rightarrow NaNO_3 H_2O$$

$$HNO_2 + NaOH \rightarrow NaNO_2 + H_2O$$

$$N_2O_3 + 2NaOH \rightarrow 2NaNO_2 + H_2O$$

Nitric acid is changed to sodium nitrate.
Nitrous acid is changed to sodium nitrite.
Nitrogen trioxide is changed to sodium nitrite. On the other hand:

$$NaNO_2O_3 \rightarrow NaNO_3 + O_2$$

Sodium nitrite reacts then with ozone producing sodium nitrate and freeing oxygen, and also:

$$H_2S + 2NaOH \rightarrow Na_2S + 2H_2O$$

Hydrogen sulfide (gas) becomes sodium sulfide (microsolid) and is also captured in the bath solution, thus being eliminated from the gas flow.

$$HCN + NaOH \rightarrow NaCN + H_2O$$

Prussic acid (gas) becomes sodium cyanide (microsolid) and is captured in the same bath solution, thus being eliminated from the gas flow. Based on the above, it can be said that from this phase it is possible to obtain a fertilizer, sodium nitrate, eliminating all the nitrogen dioxide, and all the hydrogen sulfide and prussic acid present in the starting gas flow, and the elimination of ozone has also started. The following pollutants are still carried on to the next
Carbon monoxide
Carbon dioxide
Ozone
Sulfur dioxide

Phase No. 3

This phase is designed to change carbon monoxide into carbon dioxide:

$$CO + H_2SO_4 \rightarrow CO_2 + SO_2 + H_2O$$

In this step, the solution bathing the permeating barrier is sulfuric acid in an aqueous solution, which will oxidize carbon monoxide into carbon dioxide; but it will also be split into sulfur dioxide and water. In this phase, no pollutant is captured as a microsolid, but the carbon monoxide in the starting gas flow is eliminated.
The pollutants carried to the next phase are:
Carbon dioxide
Sulfur dioxide
Ozone

Phase No. 4

This phase is designed to change carbon dioxide in a solution of carbonate of some alkali earth metal, such as calcium hydroxide as a bath solution.

$$CO_2 + Ca(OH)_2 \rightarrow CaCO_3 + H_2O$$

In this phase, carbon dioxide (gas) becomes calcium carbonate (microsolid), and is captured in the bath solution, thus eliminating all carbon dioxide present in the starting flow and all of the carbon dioxide formed in the previous phase from carbon monoxide.

The solution of calcium carbonate micro-solids could be crystallized, after the reagent of the calcium hydroxide is exhausted, and this precipitation of calcium carbonate could be used as a component of drugs or as a color, etc.

The pollutants going to the next step are:
Ozone
Sulfur dioxide

Phase No. 5

This phase is designed to eliminate the remaining ozone, which is still present after Phase 2. The normal contents of the atmosphere in Mexico City is higher than the level of nitrogen dioxide, and in Phase 2 some ozone was eliminated by causing it to react as a compound initially derived from nitrogen dioxide.

Here, the permeating barrier is bathed with a sodium nitrite solution.

$$NANO_2 + O_3 \rightarrow NaNO_3 + O_2$$

When the ozone (gas) reacts with an aqueous solution of sodium nitrite, it oxidizes it to sodium nitrate, and the ozone itself is changed to oxygen (gas).

In this part of the process there is no change of phase; but the solids solved into the starting nitrite solution are changed to sodium nitrate, which is again the same fertilizer obtained in Phase 2, and the ozone becomes also oxygen that in the same way as the oxygen obtained in the said Phase 2 will serve to enrich with this element the gas flow at the output of the soaking chamber.

The last pollutant going to the next phase is: sulfur dioxide

Phase No. 6

Here, all the sulfur dioxide present in the starting air flow is eliminated along with the sulfur dioxide formed in Phase 3, where the carbon monoxide was eliminated.

$$5SO_2 + 2KMnO_4 + 2H_2O \rightarrow K_2SO_4 + 2MnSO_4 + 2H_2SO_4$$

The solution bathing the permeable barrier in this phase of the process is potassium permanganate, which in an aqueous solution, and with sulfur dioxide present, oxidizes the latter to sulfates such as potassium sulfate and manganese sulfate, and some sulfuric acid is also obtained.

As the potassium permanganate in aqueous solution is decolorized as it reacts with sulfur dioxide, and also due to the action of the atmospheric oxygen, it cannot be used as an indicator for the maintenance of the solutions of the reagents in the different phases of the process, because it is the first product to be exhausted.

None of the original pollutants passes to the next step. These original pollutants were:
Nitrogen dioxide
Hydrogen sulfide, and/or prussic acid
Carbon monoxide
Carbon dioxide
Ozone
Sulfur dioxide

Phase No.7

This phase was designed to eliminate the microdrops which could pass of sulfuric acid produced in Phase 6.

The bath solution in this step is only water containing a germicide, such as sodium hypochlorite serving to capture these microdrops by precipitating the sulfuric acid as sodium sulfate, and the hypochlorite in diluted solution serves as a germicide to prevent bacteria from forming in the air output ports, due to the high level of humidity of the air at the end of the process.

APPLICATIONS OF THE DECONTAMINATION PROCESS

An air processor can be easily made from:
1.- A metal or plastic cabinet. If made of metal, it must be coated with anticorrosive paint to prevent attack by the chemical reagents to be used. Its dimensions must be proportionate to the flow of air to be treated.

There are standards regulating the flow of air, and the most important among them is perhaps the standard limiting the velocity of the air within ducts, specifying that it must not exceed 102 km/hr per square meter of area transverse and normal to the flow of air.

2.- One or several steps of air processing, which must include the following components:
  a) Container or vessel for the solution to be used.
  The container must also be provided with an anticorrosive coating, if it is made of metal; it must have the proper dimensions to fit in the cabinet, according to the chosen number of steps.
  b) Air-permeable barrier.
  It must be made from fibers resisting any corrosive action, because they are going to be continuously bathed in the solutions of the reagents used for eliminating the toxic gases. Any plastic fiber could be considered here, such as styrofoam, polypropylene, nylon, etc.
  This barrier must have the proper dimensions to be perpendicularly adjusted to the air flow, the cabinet, and the vessel containing the bath solution, in such a way that all the air will be forced to pass through it and that the run-offs and splashes of the process drop back into the vessel containing the solution.
  c) Pumping system for bathing the barrier.
  This system must have a good pump to totally bath the barrier previously adjusted in size, either doing the bathing by run-off on the barrier or by applying a mist or spray on the face of the barrier while first making contact with the air flow, or by combining both procedures, and so on.
  In the case of run-off, the discharge by the pump must be on top of the barrier, either by means of a perforated or grooved pipe able to irrigate as evenly as possible the top of the barrier, in order for the solution to run continuously across the whole length and width of the barrier.
  In the case of mist or spray irrigation, the discharge of the pump must go to a pipe arranged to face the barrier and containing "sprayers" or sprinklers to distribute the solution as smoothly as possible on the face of the barrier opposing the air flow. In order to optimize this part of the process, both systems can be used jointly.
3.- Air-driving system. The air can be forced through the atmospheric processor by any of the prior systems: paddle fans, squirrel cages, and so on, trying not to exceed the velocity limit at which the air may cause noise or whistling inside the ducts where it flows.
4.- Electric system.
  The electric wiring of the air processor must be such that the wires are far from being able to produce a short circuit or cause any electric shock on the cabinet, due to contact between the aqueous solutions of the reagents and the electric current. All components of the electric circuitry must be carefully coated and protected.
5.- Chemical system
  The order in which pollutants are eliminated from the air is important, and this processor must follow the sequence indicated below:

NO. 1 BARRIER

Water solution to eliminate carbon monoxide.

NO. 2 BARRIER

Sodium hydroxide solution to eliminate all nitrogen dioxide, hydrogen sulfide, prussic acid and part of the ozone.

NO. 3 BARRIER

Sulfuric acid solution to eliminate all carbon monoxide.

NO. 4 BARRIER

Calcium hydroxide solution to eliminate all carbon dioxide.

NO. 5 BARRIER

Sodium nitrite solution to eliminate all ozone.

NO. 6 BARRIER

Potassium permanganate solution to eliminate all sulfur dioxide.

NO. 7 BARRIER

Sodium hypochlorite solution to eliminate all vestiges of reagents and to prevent the proliferation of bacteria in the air output ducts.

An innovative characteristic of the process involves the conversion of the molecules of toxic gases to useful solid microparticles, and thus from nitrogen dioxide, and ozone is derived along with an aqueous solution of sodium nitrate to be used as a fertilizer. From sulfur dioxide, potassium sulfate is obtained, another fertilizer. Calcium carbonate is obtained from carbon monoxide and carbon dioxide, and it can be used as a dye, etc.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. Process for air decontamination, where air is forced in a soaking chamber through several air-permeable barriers which are continuously bathed in solutions containing various chemical reagents which remove from the air its toxic pollutants, either solids or gases, characterized in that the first barrier contains water to eliminate all solid particles suspended in a gas flow, animal, plant or mineral in nature, and in addition the elimination of carbon monoxide is started; the second barrier contains hydroxide of an alkali metal and eliminates all nitrogen dioxide, hydrogen sulfide, prussic acid and part of the ozone presence a third barrier contains sulfuric acid and eliminates all carbon monoxide; the fourth barrier contains hydroxide of an alkali earth metal and eliminates carbon dioxide; the fifth barrier contains sodium nitrite and eliminates ozone; the sixth barrier contains potassium permanganate and eliminates sulfur dioxide; and the seventh barrier comprises a dilute solution of sodium hypochlorite to eliminate all vestiges of reagents, and it also acts as a germicide solution.

* * * * *

UNITED STATES PATENT AND TRADEMARK OFFICE
CERTIFICATE OF CORRECTION

PATENT NO. : 5,227,144
DATED : July 13, 1993
INVENTOR(S) : Antonio Perez de la Garza It is certified that error appears in the above-identified patent and that said Letters Patent is hereby corrected as shown below:

Column 8, line 21, delete "presence" and insert therefor --present;--.

Signed and Sealed this

Eighth Day of February, 1994

BRUCE LEHMAN

*Attest:*

*Attesting Officer*          *Commissioner of Patents and Trademarks*